US006924954B2

(12) United States Patent
Suzuki

(10) Patent No.: US 6,924,954 B2
(45) Date of Patent: Aug. 2, 2005

(54) LIBRARY APPARATUS AND LIBRARY SYSTEM

(75) Inventor: Takeshi Suzuki, Yamagata (JP)

(73) Assignee: NEC Corporation, Tokyo (JP)

( * ) Notice: Subject to any disclaimer, the term of this patent is extended or adjusted under 35 U.S.C. 154(b) by 218 days.

(21) Appl. No.: 10/302,945

(22) Filed: Nov. 25, 2002

(65) Prior Publication Data

US 2003/0099056 A1 May 29, 2003

(30) Foreign Application Priority Data

Nov. 26, 2001 (JP) ........................................ 2001-360151

(51) Int. Cl.[7] ............................................ G11B 15/18
(52) U.S. Cl. ...................................................... 360/69
(58) Field of Search ........................ 360/69, 71, 78.04, 360/92, 98.06; 711/114, 159; 700/214; 707/102

(56) References Cited

U.S. PATENT DOCUMENTS

| 4,453,188 | A | * | 6/1984 | Johnson et al. | .......... 360/78.04 |
| 5,235,474 | A | * | 8/1993 | Searle | .......... 360/71 |
| 5,345,350 | A | * | 9/1994 | Ellis et al. | .......... 360/92 |
| 5,576,911 | A | * | 11/1996 | Porter | .......... 360/98.06 |
| 6,029,230 | A | * | 2/2000 | Ng | .......... 711/159 |
| 6,038,490 | A | * | 3/2000 | Dimitri et al. | .......... 700/214 |
| 6,097,566 | A | * | 8/2000 | Heller et al. | .......... 360/92 |
| 6,480,350 | B1 | * | 11/2002 | Malone | .......... 360/69 |
| 6,711,580 | B2 | * | 3/2004 | Dahman et al. | .......... 707/102 |
| 6,754,768 | B2 | * | 6/2004 | Dimitri et al. | .......... 711/114 |

FOREIGN PATENT DOCUMENTS

| JP | 3-35468 A | 2/1991 |
| JP | 9-115219 A | 5/1997 |
| JP | 11-7684 A | 1/1999 |
| JP | 2000-90545 A | 3/2000 |
| JP | 2000-348417 A | 12/2000 |

* cited by examiner

*Primary Examiner*—David Hudspeth
*Assistant Examiner*—Fred F. Tzeng
(74) *Attorney, Agent, or Firm*—Sughrue Mion, PLLC

(57) ABSTRACT

A plurality of library apparatuses is placed on top of each other to comprise one library system as a whole. Each library apparatus has a plurality of cabinets, a plurality of read/write apparatuses, a slot, a controller, and a transfer mechanism having a function of transferring the recording medium according to control of the controller. The controller causes (controles) the transfer mechanism to transfer the recording medium among the cabinet, read/write apparatus, slot, and slots of library apparatuses provided adjacent to each other. The recording medium is loaded from the cabinet of an arbitrary library apparatus, transferred from the transfer mechanisms of the plurality of library apparatuses sequentially as required, and the transferred recoding medium is accessed by the read/write apparatus of an arbitrary library apparatus. The recording medium accessed by the read/write apparatus is transferred in the same way and stored in the cabinet.

26 Claims, 13 Drawing Sheets

LIBRARY APPARATUS AND LIBRARY SYSTEM

BACKGROUND OF THE INVENTION

1. Field of the Invention

The present invention relates to a library apparatus and library system that accommodates recording media, writes data on the recording media, and reads data therefrom.

2. Description of the Related Art

The library system is an apparatus that is used in a data search system, etc., and accommodates numerous recording media, selects a recoding medium on which desirably accessing data is recorded from among these recording media, and gains access to the selected data.

One example of the library system is disclosed in Unexamined Japanese Patent Application KOKAI Publication No. 2000-90545. It is assumed that the contents of this document are included in this specification.

The library system described in Unexamined Japanese Patent Application KOKAI Publication No. 2000-90545 is called a modular data storage system. This library system can increase a recording medium accommodating capacity by placing one or a plurality of additional library apparatuses (additional modules) upon a basic library apparatus (basic module).

In this library system, the basic module has a transfer mechanism, and the additional modules have cabinets and read/write apparatuses but no transfer mechanism. The transfer mechanism of the basic module transfers the recording media among the cabinets of a plurality of modules and between read/write apparatuses.

According to this system structure, one transfer mechanism transfers the recording media between all cabinets of the plurality of modules and between read/write apparatuses. For this reason, the distance where the transfer mechanism reciprocates for carrying a recording media becomes long and much time is required for reciprocating motion, so that the recoding media cannot be efficiently transferred in some cases.

SUMMARY OF THE INVENTION

The present invention has been made with consideration given to the aforementioned problems, and an object of the present invention is to provide a library system and library apparatus capable of transferring recording media efficiently.

In order to attain the above object, according to a first aspect of the present invention, there is provided a library apparatus a library apparatus including a controller; a plurality of cabinets for storing a plurality of recoding media; a plurality of read/write apparatuses that write or read data on each recording medium; a slot to which the recording medium is insertable; a transfer mechanism that has a function of transferring the recording medium according to control of the controller; and a case that accommodates the cabinets, the read/write apparatuses, the transfer mechanism, and the slot; wherein the controller causes the transfer mechanism to unload the recoding medium from the cabinet and to insert the unloaded recording medium to the read/write apparatus, the slot, or an external slot provided at a predetermined position of an external portion of the case, the controller causes the transfer mechanism to unload the recoding medium from the read/write apparatus and to insert the unloaded recording medium to the cabinet, the slot, or the external slot, the controller causes the transfer mechanism to unload the recoding medium from the slot and to insert the unloaded recording medium to the cabinet, the read/write apparatus, or the external slot, or the controller causes the transfer mechanism to unload the recoding medium from the external slot and to insert the unloaded recording medium to the cabinet, the read/write apparatus, or the slot.

Said case may have such a configuration that can place other library apparatuses on top of each other, the other library apparatuses may have the same structure as said library apparatus, and the external slot is formed of a slot included in each other library apparatus that is placed upon said library apparatus.

Said plurality of cabinets, said read/write apparatuses, and said slot may have loading ports for receiving medium, respectively, the respective loading ports are arranged around said transfer mechanism to be directed to said transfer mechanism, and said transfer mechanism includes a lifter mechanism that ascends/descends in a vertical direction to position the recording medium for transfer, and a picker mechanism that rotates and slides in a horizontal direction to deliver the recording medium between delivering and receiving apparatuses.

Said picker mechanism may include; a turn table which has a motor that rotates according to control of said controller and which turn by use of rotational force of the motor; and a clamp drive section which has a pair of clamps and which slide on the turn table linearly and which open and close the pair of clamps to hold the recording medium to unload the recording medium from said cabinet, said read/write apparatus, said slot, and the external slot or load thereon.

Said lifter mechanism may include; a base section on which the picker mechanism is mounted; a guide section that contains the base section to be movable up and down; a first transmission mechanism which have a motor that rotate according to control of said controller and which move up and down the guide section by use of a rotational force of the motor; and a second transmission mechanism, which is connected with the first transmission mechanism and which move up and down the base section in the guide section by use of the ascent and descent motions of the guide section.

Said lifter mechanism may be structured such that the guide section can ascend/descend and the base section can ascend/descend in the guide section.

According to a second aspect of the present invention, there is provided a library system wherein a plurality of library apparatuses described in the first aspect is placed on top of each other such that a recording medium can be transferred from one library apparatus to the adjacent library apparatuses and access to the recording medium placed in an arbitrary library apparatus can be gained by a read/write apparatus of an arbitrary library apparatus.

According to a third aspect of the present invention, there is provided a library system including at least one controller; a first library apparatus including a plurality of first cabinets that store a plurality of recording media respectively, a plurality of first read/write apparatuses that write or read data on each recording medium, a slot to which the recoding medium is insertable, and a first transfer mechanism having a function of transferring the recording media according to control of the controller; and a second library apparatus including a plurality of second cabinets that store a plurality of recording media respectively, a plurality of second read/write apparatuses that write or read data on each recording medium, and a second transfer mechanism having a function of transferring the recording media according to control of the controller, wherein the controller causes the first transfer mechanism to unload the recoding medium from the first cabinet and to insert the unloaded recording medium to the first read/write apparatus or the slot, the controller causes the first transfer mechanism to unload the recoding medium from the first read/write apparatus and to store the unloaded recording medium to the first cabinet, or the controller causes the first transfer mechanism to unload the recording medium the lot and to insert the unloaded recording medium to the first cabinet or the first read/write apparatus, the controller causes the second transfer mechanism to unload the recording medium from the second cabinet and to insert the unloaded recording medium to the second read/write apparatus or the slot, the controller causes the second transfer mechanism to unload the recording medium from the second read/write apparatus and to insert the unloaded recording medium to the second cabinet or the slot, or the control causes the second transfer mechanism to unload the recording medium from the slot and to insert to the second read/write apparatus.

Said controller may cause said first transfer mechanism to unload the recording medium from said first read/write apparatus and to insert said unloaded recording medium to said slot, and said second controller causes said second transfer mechanism to unload the recording medium from said slot and to store the unloaded recording medium to said second cabinet.

Said first library apparatus may include a first case that contain said first cabinets, said first read/write apparatuses, said slot and said first transfer mechanism, said second library apparatus include a second case that contain said second cabinets, said second read/write apparatuses, and each of said first and second cases may have a configuration that can place said first and second library apparatus on top of each other.

According to a fourth aspect of the present invention, there is provided a library apparatus including storing sections that can store a plurality of recording media; read/write apparatuses that gain access to each recording medium; a holding section that holds the recording medium; and transferring means that transfers the recording medium among the storing section, the read/write apparatus, the holding section, and a holding section for other library apparatuses provided adjacent to each other.

According to a fifth aspect of the present invention, there is provided a library system wherein a plurality of library apparatuses described in the fourth aspect is placed on top of each other such that a recording medium can be transferred from one library apparatus to the adjacent library apparatuses and access to the recording medium placed in a storing section of an arbitrary library apparatus can be gained by a read/write apparatus of an arbitrary library apparatus.

According to a sixth aspect of the present invention, there is provided a library apparatus including a plurality of storing means that stores a plurality of recording media; access means that gains access to each recording medium; a holding section that holds the recording medium; and transferring means that transfers the recording medium among the storing section, the access means, the holding section, and a holding section for other library apparatuses provided adjacent to each other.

According to a seventh aspect of the present invention, there is provided a library system wherein a plurality of library apparatuses described in the fifth aspect is placed on top of each other such that a recording medium can be transferred from one library apparatus to the adjacent library apparatuses and access to the recording medium placed in a storing section of all arbitrary library apparatus can be gained by a read/write apparatus of an arbitrary library apparatus.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

The following will specifically explain the library apparatus and library system according to an embodiment of the present invention with reference to the accompanying drawings.

Figure 1:
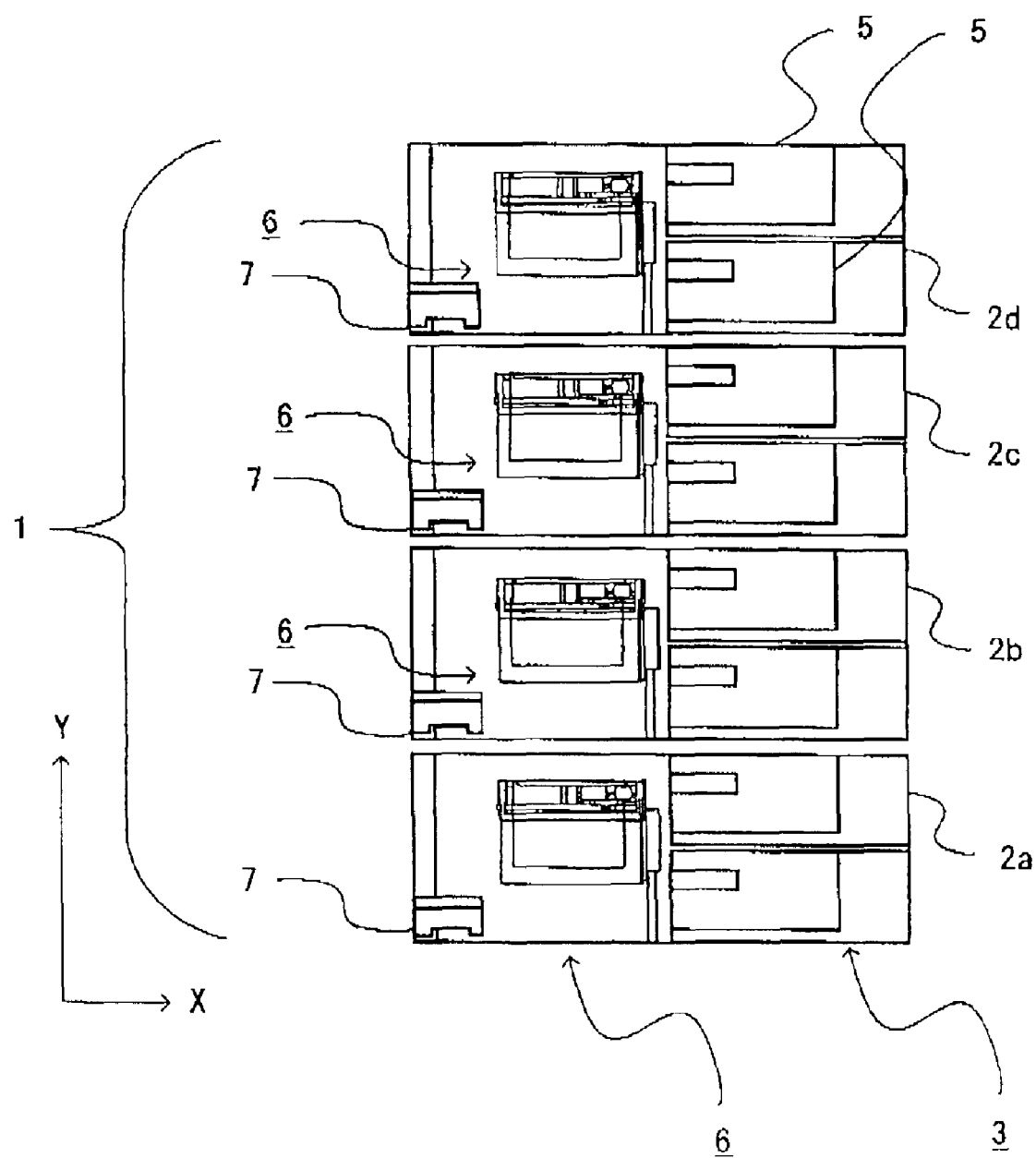
FIG. 1 is a side view illustrating the structure of a library system according to an embodiment of the present invention.

A library system 1 of this embodiment composes four library apparatuses (modules) 2a, 2b, 2c, 2d which are placed on top of each other in a vertical direction (Y-axial direction in the figure) as shown in FIG. 1. Hereinafter, these library apparatuses 2a to 2d are generally called as library apparatuses 2.

Figure 2:
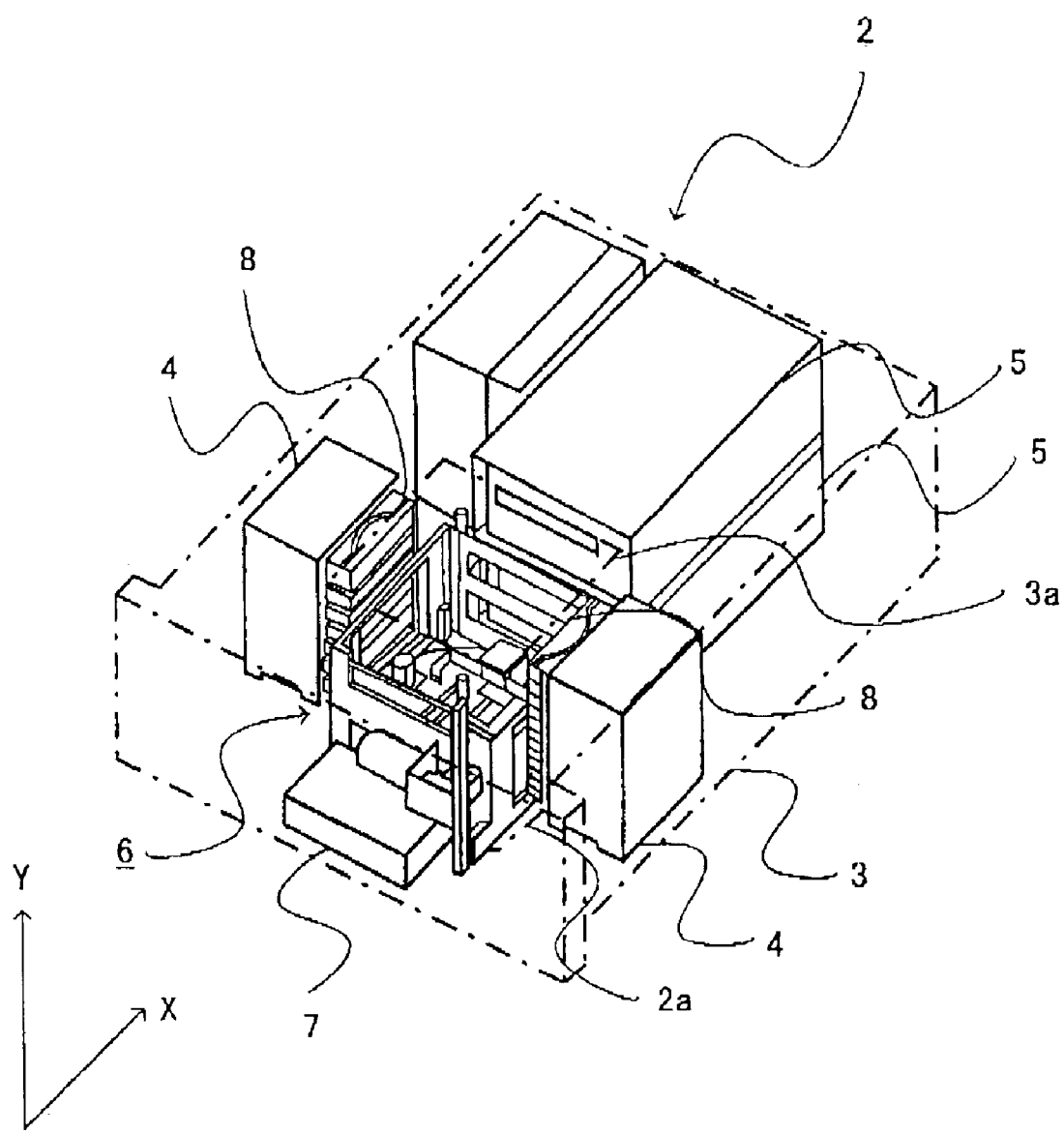
FIG. 2 is a perspective view illustrating the structures of the respective library apparatuses that constructs the library system of FIG. 1.

Each library apparatus 2 has a case 3, a plurality of magazines 4, a plurality of read/write apparatuses 5, an accessor mechanism 6, and a delivery slot 7 as shown in FIG. 2.

Figure 3A:
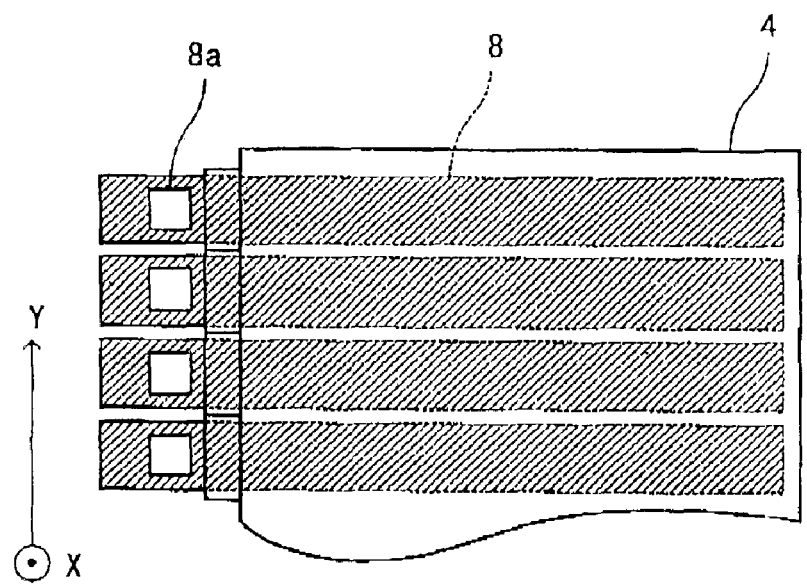
FIG. 3A and FIG. 3B are side views of a magazine of the library apparatus of FIG. 2 and a perspective view thereof, respectively.
Figure 3B:
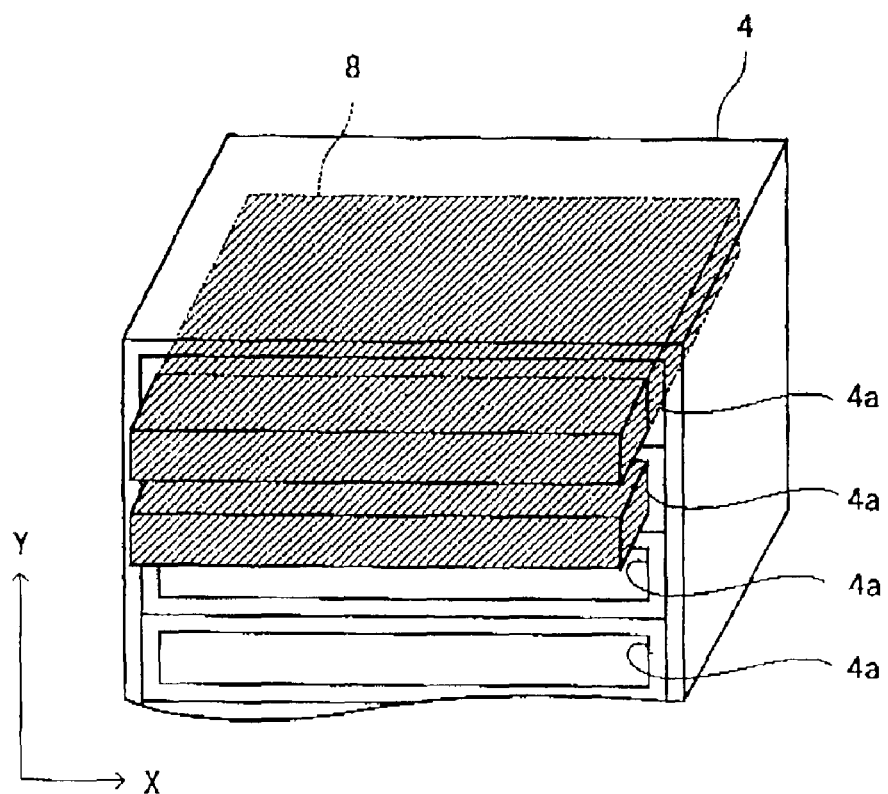

Each of magazines 4 is structured to store a plurality of cartridges 8 each containing a recording medium (for example, magnetic tape) therein. The magazines 4 are arranged around the accessor mechanism 6 such that the accessor mechanism 6 can load/unload a cartridge 8 onto/ from the magazine 4. More specifically, each magazine 4 has a shelf-like configuration in which the cartridges 8 are insertable to be placed on top of each other as illustrated in FIG. 3A and FIG. 3B. Each magazine 4 has a shelf-like form, loading/unloading openings 4a that is formed to be directed to the accessor mechanism 6.

Each read/write apparatus 5 includes, for example, a magnetic tape drive device, etc., writes data on a recoding medium contained in the loaded cartridge 8, or reads data recorded on the recording medium. Loading the cartridge 8 on each read/write apparatus 5 or unloading the cartridge 8 from each read/write apparatus 5 is carried out by the accessor mechanism 6.

The accessor mechanism 6 transfers the cartridge 8 among the plurality of magazines 4 of the corresponding library apparatus 2, the plurality of read/write apparatuses 5, the delivery slot 7 of the corresponding library apparatus 2, and the delivery slot 7 of the library apparatus 2 placed at the upper stage. For example, the accessor mechanism 6 of the library apparatus 2b, which is placed at the second stage from the bottom in FIG. 1, transfers the cartridge 8 among the plurality of magazines 4, the plurality of read/write apparatuses 5, the delivery slot 7, which are placed in the library apparatus 2b, and the delivery slot 7 of the library apparatus 2c placed at the upper stage. The structure and operation of the accessor mechanism 6 are specifically described later.

The delivery slots 7 are formed to transfer the cartridge 8 by between the adjacent library apparatuses 2 in a state that the plurality of library apparatuses 2 are placed on top of each other as illustrated in FIG. 1, and has a configuration that can store the cartridge 8.

A case 3 contains the plurality of magazines 4, the plurality of read/write apparatuses 5, the accessor mechanism 6, and the delivery slot 7. The case 3 has a substantially rectangular parallelepiped shape to be stackable. At the top and bottom portions of the case 3, which correspond to the accessor mechanism 6, openings 3a are formed such that the cartridge 8 can be delivered by the accessor mechanisms 6 between the library apparatuses 2 in a state that the plurality of library apparatuses 2 are placed on top of each other.

In addition, this case 3 has an insertion openings (not shown) for passing the cartridge 8 that contains the recording medium to the accessor mechanism 6 from outside of the corresponding case 3.

A detailed explanation is next given of the structure and operation of the aforementioned accessor mechanism 6 with reference to FIGS. 4 to 10.

Figure 4:
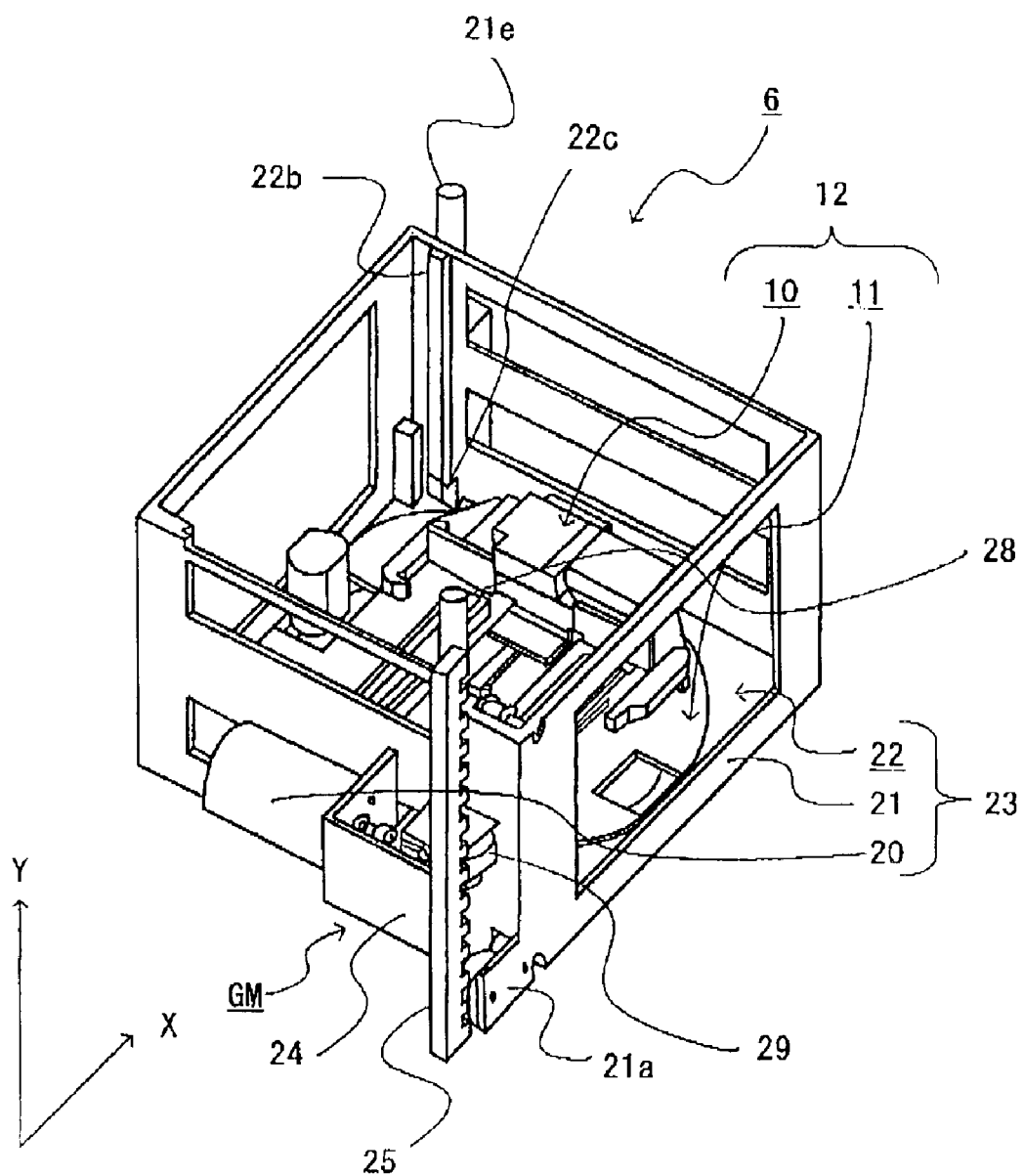
FIG. 4 is a perspective view illustrating the structure of an accessor mechanism of the library apparatus of FIG. 2.

The accessor mechanism 6 has a mechanism that transfers the cartridge 8 vertically to be positioned and a delivery mechanism that rotates and slides horizontally to deliver the cartridge 3 between delivering and receiving apparatuses (such as read/write apparatus 5, etc.,). More specifically, as shown in FIG. 4, the accessor mechanism 6 includes a picker mechanism 12 having a clamp 10 and a turn table 11 and a lifter mechanism 23 having a motor 20, a guide lifter 21, and a lifter base 22.

Figure 5A:
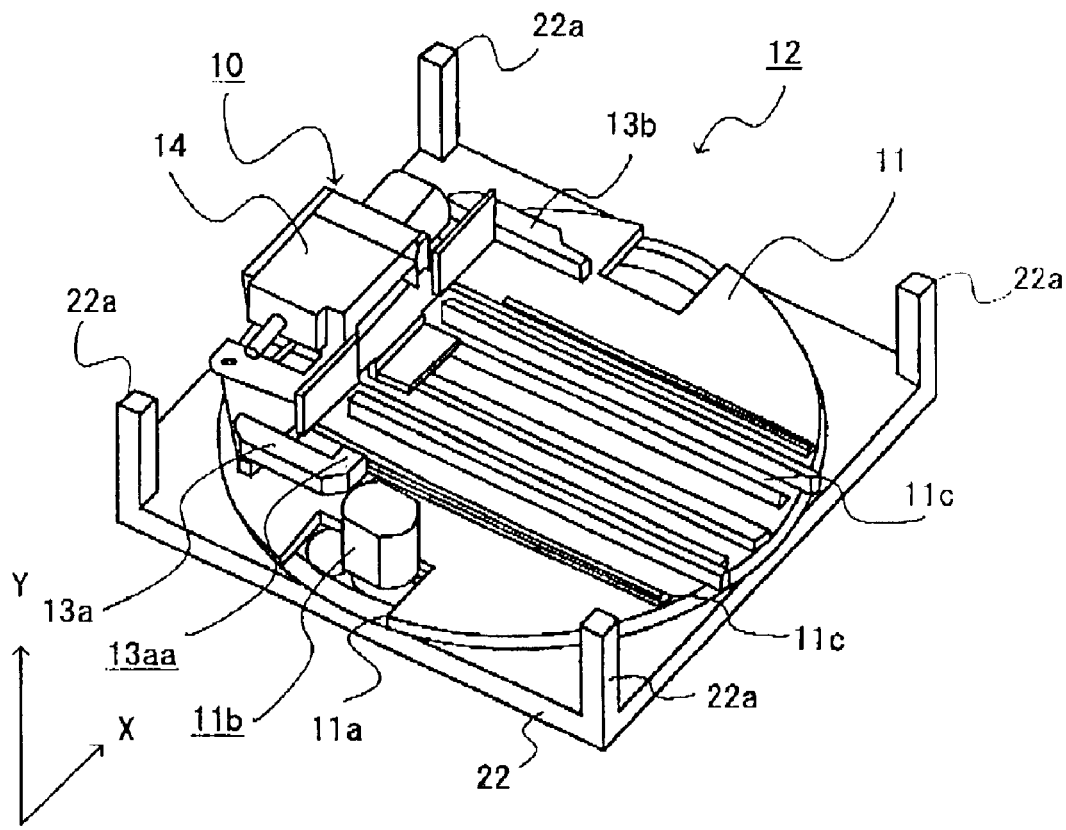
FIG. 5A is a perspective view illustrating a picker mechanism of the accessor mechanism of FIG. 4 and a lifter base structure thereof.

The clamp 10 of the picker mechanism 12 is placed un the turn table 11, and has a pair of clamp arms 13a and 13b, and a clamp driving section 14 as shown in FIG. 5A. The clamp driving section 14 causes the pair of clamp arms 13a and 13b to reciprocate linearly in a radial direction of the turn table 11, and opens and closes the clamp arms 13a and 13b to hold or release the cartridge 8.

In addition, the clamp arm 13a has a curved portion (claw) 13aa at its end. This claw 13aa fits into a concave portion 8a of the cartridge 8 shown in FIG. 3A, with the result that the clamp arms 13a and 13b hold the cartridge 8 firmly.

Figure 5B:
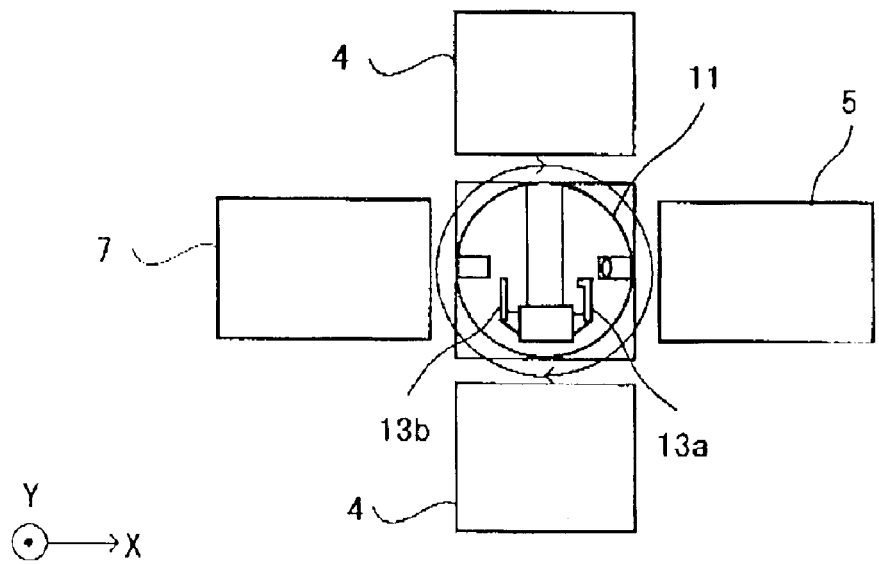
FIG. 5B is a view explaining an operation of the picker mechanism.

The substantially disc-like turn table 11 has a notch 11a that is formed on an outer peripheral portion of the turn table 11, a motor 11b that is placed at this notch 11a, and a linear guide 11c that is placed on the turn table 11. The turn table 11 is turned in an arbitrary direction by the rotation of the motor 11b as schematically shown in FIG. 5B. Moreover, the clamp 10 moves in a radial direction of the turn table 11 along the linear guide 11c.

Each of the guide lifter 21 and lifter base 22 of the lifter mechanism 23 shown in FIG. 4 ascends and descends by use of a rotational force of the motor 20 in order to position the picker mechanism 12 to an appropriate height.

Figure 6:
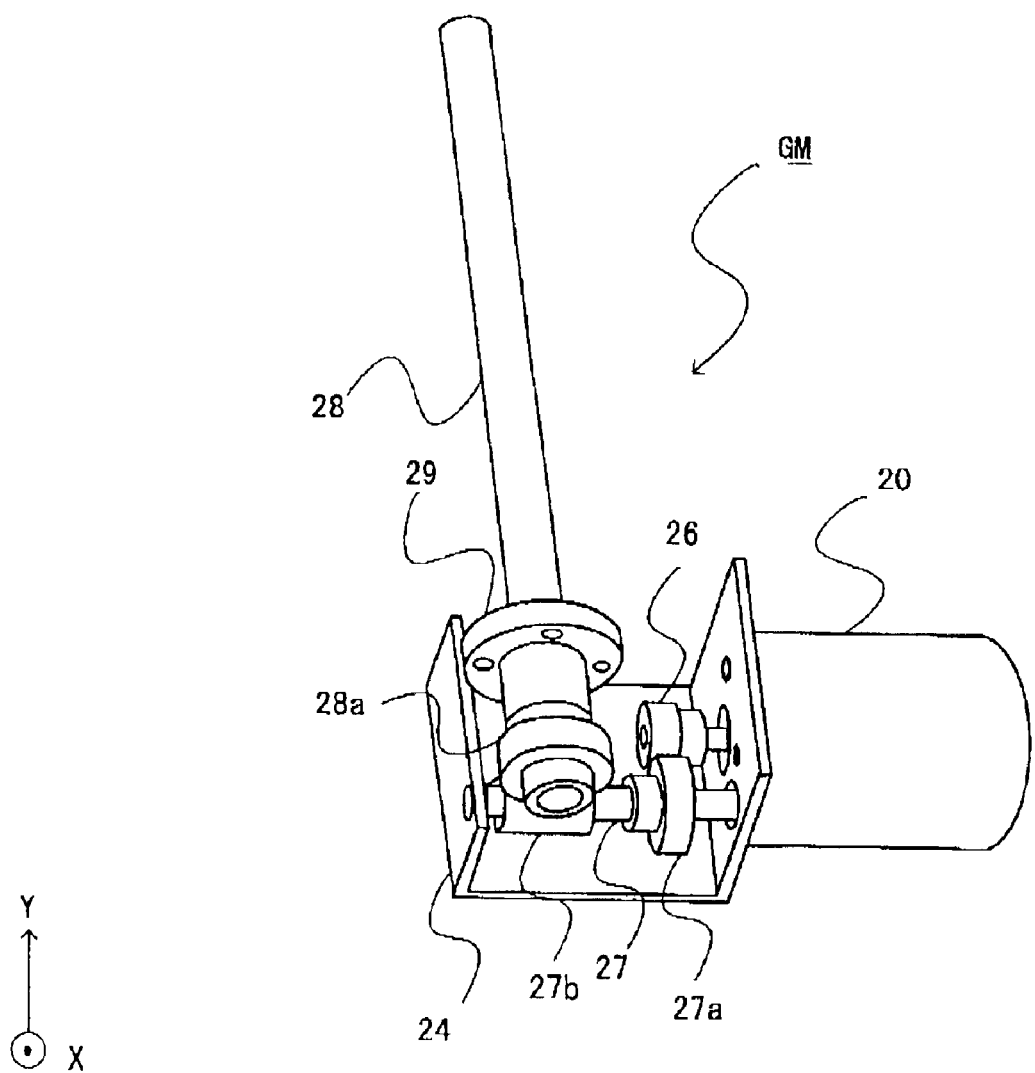
FIG. 6 is a view illustrating the structure of a gear transmission mechanism that a guide lifter has.

The guide lifter 21 has a rectangular parallelepiped frame as shown in FIG. 4. Moreover, the guide lifter 21 has a gear transmission mechanism GM provided with a rack 25, a motor gear 26, a first shaft 27, a second shaft 28, and a screw nut 29 as shown in FIGS. 4 and 6. The gear transmission mechanism GM ascends and descends the guide lifter 21 by use of the rotational force of the motor 20.

More specifically, the motor 20 is mounted to a substantially central portion of the rack 25 by a motor bracket 24 as shown in FIG. 4. The rack 25 is placed on the case 3 in a standing manner to be parallel to a direction where the guide lifter 21 ascends and descends. The motor gear 26 is attached to the tip end of the rotational shaft of the motor 20 as shown in FIG. 6. The first shaft 27 is provided with a gear 27a that engages with the motor gear 26 and a worm 27b for transmitting the rotation of the motor 20 to the second shaft 28.

A worm wheel 28a, which engages with the worm 27b, is attached to the second shaft 28 at its one end. The second shaft 28 has threads. At the center of the screw nut 29, there is formed an opening with a groove tapped to have the same pitch as the thread of the second shaft 28. The screw nut 29 is screwed in the second shaft 28. The screw nut 29 is fixed to the guide lifter 21 as shown in FIG. 4.

When the motor 20 rotates, the rotational force of the motor 20 is transmitted to a gear 27a from the motor gear 26, so that the first shaft 27 rotates and at the same time the worm 27b rotates. Moreover, the worm wheel 28a that engages with the worm 27b rotates and the second shaft 28 to which the worm wheel 28a is fixed also rotates. The second shaft 28 thus rotates, with the result that the screw nut 29 ascends and descends through the threads of the second shaft 28, and the guide lifter 21 to which the screw nut 29 is fixed ascends and descends along the second shaft 28.

Figure 7A:
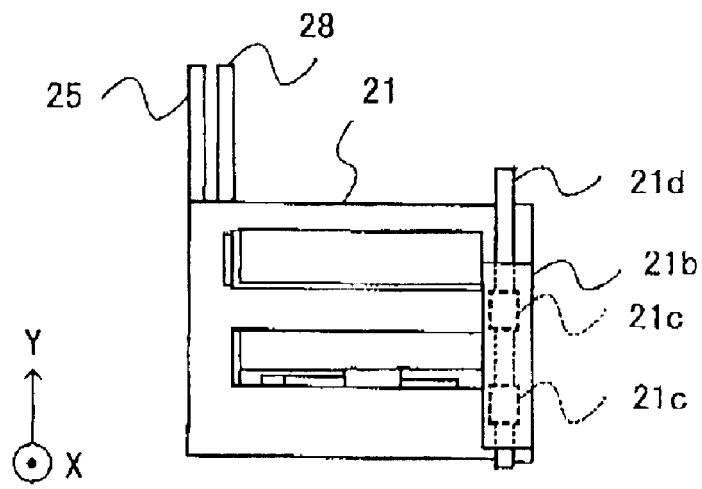
FIG. 7A is a side view illustrating a shape of a side surface of the accessor mechanism of FIG. 4.
Figure 7B:
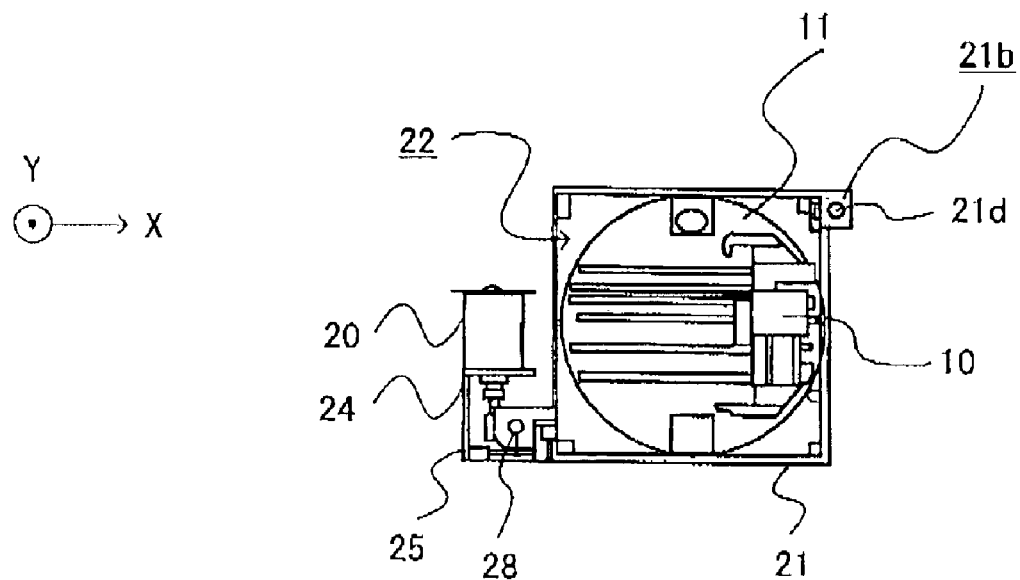
FIG. 7B is a plane view illustrating a shape of an upper surface of the accessor mechanism thereof.

As illustrated in FIGS. 7A and 7B, at a corner portion, which is positioned to be diagonal to a corner portion where the screw nut 29 of the guide lifter 21 is attached (portion where force is applied when the guide lifter 21 goes up and down), there is provided a fixing section 21b. in the fixing section 21b, a through-hole is formed, and bushes (pipes) 21c are arranged in its interior. A guide rod 21d is vertically provided on the bottom of the case 3 in a standing manner in order to pass through the through-hole and bushes 21c. The outer diameter of the guide rod 21d and the inner diameter of the bush 21c are formed to be substantially the same. The bushes 21c slide up and down through the guide rod 21d according to the ascent and decent of the guide lifter 21 to suppress rattle of the guide lifter 21.

The lifter base 22 shown in FIG. 4 is placed in the guide lifter 21 to freely ascend and descend. The lifter base 22 has a substantially rectangular plane shape and mounts the picker mechanism 12 (clamp 10 and turn table 11) thereon as shown in FIG. 5A. The lifter base 22 further ascends/descends to/from the guide lifter 21 to adjust the position of the vertical direction of the picker mechanism 12 according to the ascent and descent of the guide lifter 21.

Figure 8:
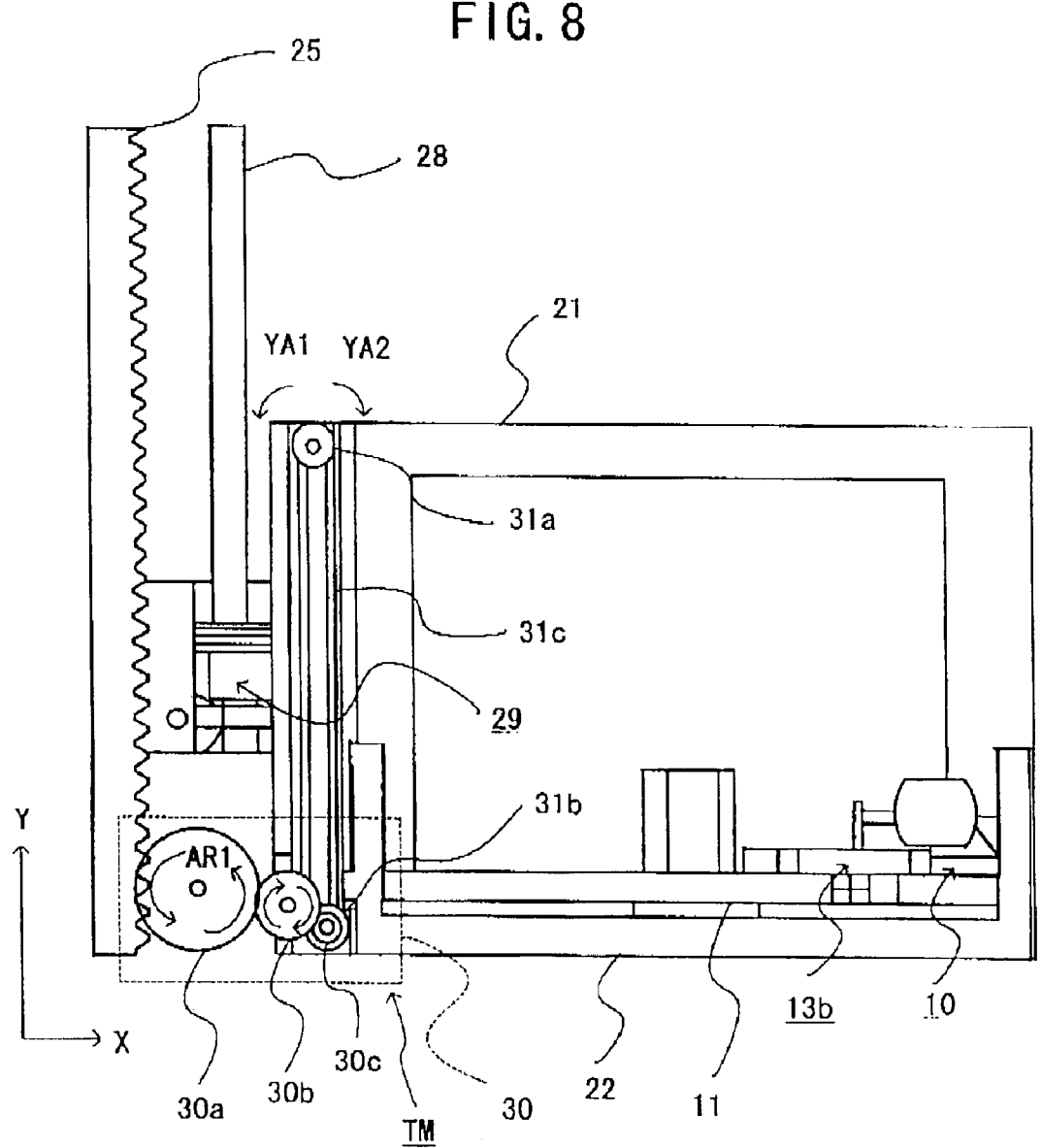
FIG. 8 is a side view illustrating a cross-section of a lifter base and a guide lifter, which are parallel to an X-Y axial plane of FIG. 4.

The lifter base 22 has a transmission mechanism TM composed of a gear column 30, sprocket wheels 31a, 31b, and a toothed belt 31c as shown in FIG. 8 (cross-section of the guide lifter 21 and the lifter base 22, which are parallel to an X-Y axial plane of FIG. 4). The transmission mechanism TM works for ascending/descending the lifter base 22 by use of the ascent and the descent motions of the guide lifter 21.

More specifically, the gear column 30 is provided with a pinion 30a, which engages the rack 25, an idler gear 30b which engages with the pinion 30a, and a gear 30c which is formed along the same axis as the sprocket wheel 31b and which engages with the idler gear 30b. The pinion 30a and idler gear 30b are attached to a bracket 21a that is formed on the guide lifter 21 as shown in FIG. 4.

The sprocket wheels 31a and 31b shown in FIG. 8 are attached to the upper and lower portions of the guide lifter 21, respectively. A toothed belt 31c is stretched between sprocket wheels 31a and 31b. Moreover, one side end portion of the lifter base 22 is fixed to the toothed belt 31c. In addition, a roller chain may be used in place of the toothed belt 31c.

When the guide lifter 21 ascends and descends, the pinion 30a that engages with the rack 25 rotates, and the idler gear 30b rotates in synchronization with the pinion 30a. The gear 30c rotates in synchronization with the rotation of the idler gear 30b, and the sprocket wheel 31b rotates with the rotation of the gear 30c. In accordance with the rotation of the sprocket wheel 31b, the toothed belt 31c also rotates. In accordance with the rotation of the toothed belt 31c, the lifter base 22 where one side end portion is fixed to the toothed belt 31c also moves (ascends and descends). In other words, when the guide lifter 21 rises parallel to the rack 25 (vertical direction), the pinion 30a rotates in a direction of an arrow AR1 of FIG. 8, the toothed belt 31c rotates in a direction of an arrow YA1, and the lifter base 22 moves up with reference to the guide lifter 21. Conversely, when the guide lifter 21 descends parallel to the rack 25, the toothed belt 31c rotates in a direction of an arrow YA2, and the lifter base 22 moves down with reference to the guide lifter 21.

Figure 9B:
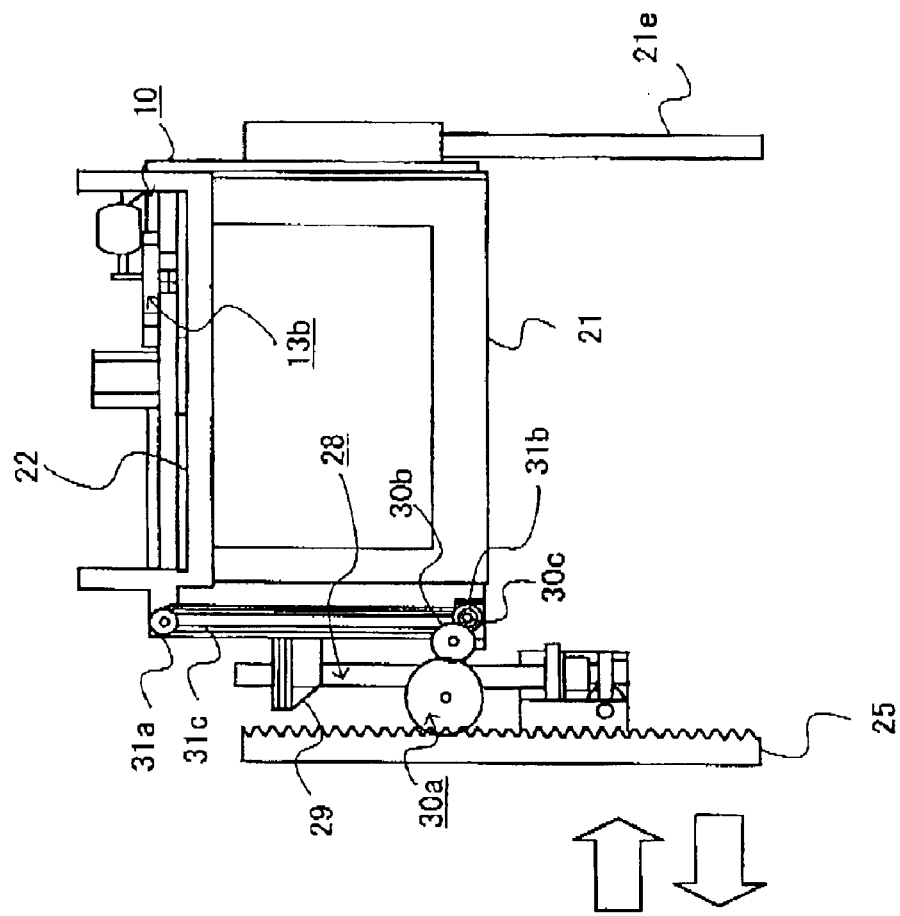
FIG. 9A and FIG. 9B are side views explaining the operations of the guide lifter and lifter base.
Figure 9A:
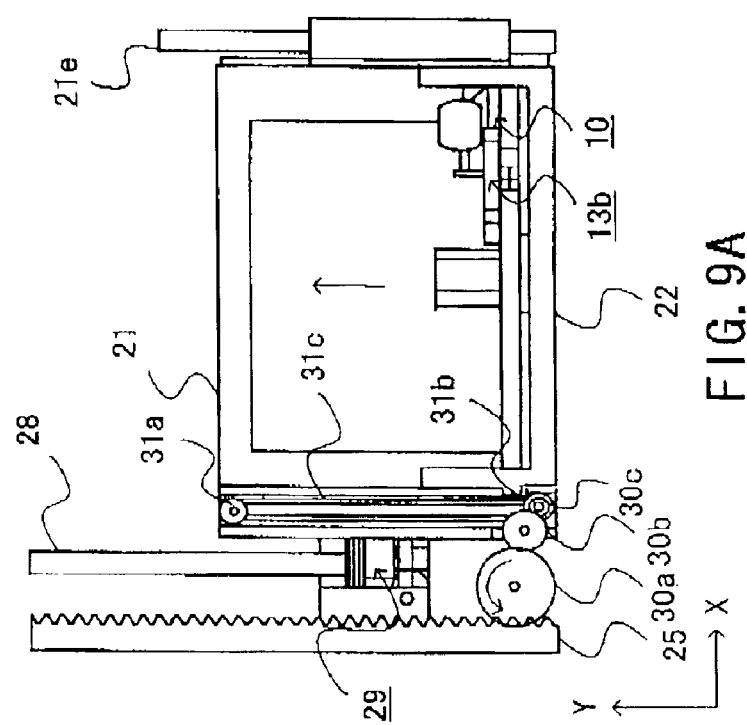

Accordingly, when the motor 20 rotates in a first rotational direction at an initial state shown in FIG. 9A, the guide lifter 21 rises and the lifter base 22 rises with reference to the guide lifter 21, with the result that the lifter base 22 projects from the upper portion of the guide lifter 21 at a state shown in FIG. 9B. On the other hand, when the motor 20 rotates in a second rotational direction in the state shown in FIG. 9B, the guide lifter 21 descends and the lifter base 22 descends with reference to the guide lifter 21, resulting that the guide lifter 21 and the lifter base 22 returns to the state shown in FIG. 9A. An amount of movement of the guide lifter 21 and an amount of the lifter base 22 with respect to the guide lifter 21 can be arbitrarily set by appropriately setting pitch diameters of the sprocket wheel 31b and the gear 30c, respectively.

In addition, the linear guide or a rail 22b that extends vertically is placed at an inner surface of the guide lifter 21 as shown in FIG. 4 such that the lifter base 22 can smoothly ascend and descend in the guide lifter 21. Furthermore, a slider 22c that can move up and down through the rail 22b is fixed to the lifter base 22.

Moreover, at four corners of the lifter base 22, projections 22a are formed vertically as shown in FIG. 5A. The projections 22a come in contact with the inner wall of the guide lifter 21 to the extent that would not prevent the ascent and the descent motions of the lifter base 22, and maintain the posture of the guide lifter 21 horizontally.

An explanation is next given of the structure of a control circuit of the library system 1.

Figure 10:
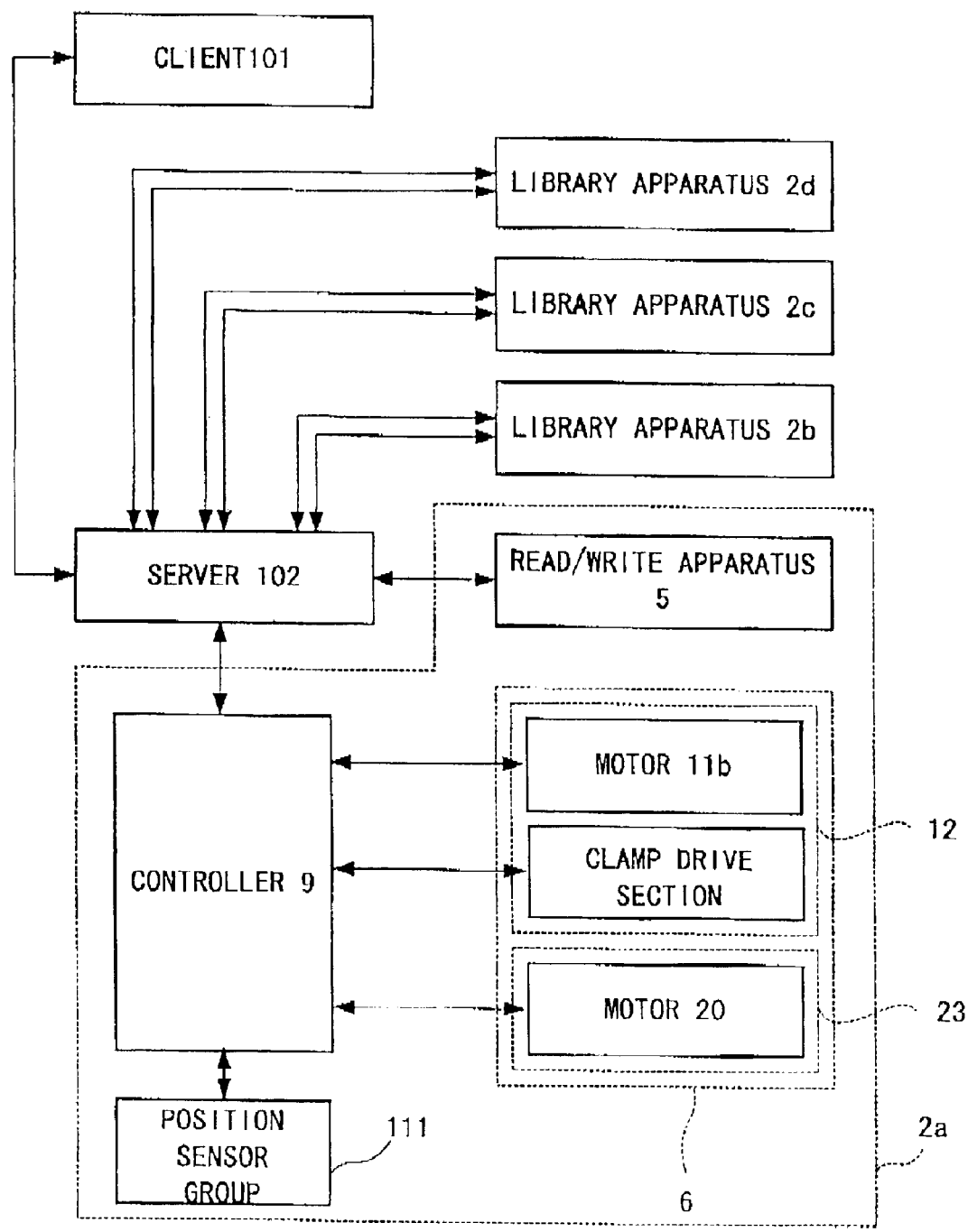
FIG. 10 is a block diagram explaining a control system of the library apparatus.

As illustrated in FIG. 10, the library system 1 includes a server (server computer) 102 that controls the entire operation in accordance with the request from a client 101. Moreover, each of the library apparatuses 2 (2a, 2b, 2c, 2d) includes a controller 9 that controls the motor 11b and clamp driving section 14 of the picker mechanism 12 and the motor 20 of the lifter mechanism 23 under request of the server 102. The controller 9 includes a position sensor group 111 that determines the position of the clamp 10 in the vertical direction and the direction of the turn table 11.

The controller 9 of each of the library apparatuses 2a, 2b, 2c, 2d includes one-chip micro-computer, etc., and is connected to the server 102.

The server 102 is connected to the read/write apparatus 5 and controller 9 of each of the library apparatuses 2a, 2b, 2c, 2d and the client computer (client) 101. The server 102 stores a table in which the position of the loading/unloading openings 4a of each of the plurality of magazines 4 is associated with the contents (content of data, free capacity, etc.) of the recording medium to be contained by the cartridge 8 loaded onto the loading/unloading openings 4a.

When access to the recording medium is instructed from the client 101, the server 102 searches and specifies a cartridge 8 for storing the corresponding recording medium using the table which the server 102 stores. The server 12 further specifics a read/write apparatus 5 for accessing to the cartridge 8. In order to accessing to the specified cartridge 8 by the specified read/write apparatus 5, the server 102 sequentially instructs the plurality of controllers 9 to transfer the cartridge 8 as required. When access to the recording medium ends, the server 102 instructs the controller 9 to unload the cartridge 8 from the read/write apparatus 5, and to carry out the cartridge 8 to each vacant loading/unloading openings 4a. Details on the operation of transferring the cartridge 8 will be described later.

The operations of the above-structured library system 1 and library apparatus 2 are next explained with reference to FIG. 11.

When a user provides an instruction to store from the client 101, for example, recording data, this instruction is transmitted to the server 102. In response to this instruction, the server 102 selects an arbitrary cartridge 8 (for example, cartridge 8 that has contained a recording medium having free capacities necessary for storing data) from among the plurality of cartridges 8 stored in the plurality of magazines 4. Moreover, the server 102 specifies the read/write apparatus 5 that is to access to this recording medium (FIG. 11: step S101).

Next, it is determined whether or not the accessing cartridge 8 and the read/write apparatus 5, which is to access to the recording medium contained in the corresponding cartridge 8, are positioned at the same library apparatus 2 (step S102).

When it is determined that they are positioned at the same library apparatus 2 (step S102: YES), the processing flow proceeds to stop S103.

In step S103, the server 102 instructs the controller 9 of the specified library apparatus 2 to unload the specified cartridge 8 from the magazine 4 and to mount the unloaded cartridge 8 on the read/write apparatus 5. The controller 9 starts the following control operation according to this instruction.

First of all, the controller 9 determines a current vertical position of the picker mechanism 12 (clamp 10) from an output of the sensor group 111, and obtains a distance and a direction that the specified cartridge 8 should be vertically moved in order to unload the specified cartridge 8.

The controller 9 rotates the motor 20 to move up or down the lifter mechanism 23 and positions the clamp 10 to such a height that the specified cartridge 8 stored in the magazine 4 can be unloaded.

The controller 9 rotates the motor 11b to direct the clamp 10 to the magazine 4 on which the specified cartridge 8 is stored. The controller 9 causes (controls) the clamp driving section 14 to open the pair of clamp arms 13a and 13b. The controller 9 controls the clamp driving section 14 such that the clamp 10 is moved forth to the magazine 4 through the linear guide 11c up to a position where the cartridge 8 can be held by the clamp arms 13a and 13b.

The controller 9 controls the clamp driving section 14 to hold the cartridge 8 by the pair of clamp arms 13a and 13b. Next, the controller 9 controls the clamp driving section 14 to move back the clamp 10 through the linear guide 11c and to unload the cartridge 8 from the magazine 4.

Next, the controller 9 controls the motor 20 to rotate, to move up or back the lifter mechanism 23, and positions the clamp 10 to the cartridge loading port of the read/write apparatus 5. After that, the controller 9 rotates the motor 11b of the turn table 11 to turn the turn table 11 such that the clamp 10 faces to the read/write apparatus 5.

Sequentially, the controller 9 controls the clamp driving section 14 to move the clamp 10 to the read/write apparatus 5 forward by a predetermined distance, and loads the cartridge 8 on the read/write apparatus 5. After that, the controller 9 controls the clamp driving section 14 to open the clamp arms 13a and 13b, and releases the cartridge 8. Then, the controller 9 controls the clamp driving section 14 to move the clamp 10 backward. The controller 9 transmits information, which indicates that a series of control operations ends, to the server 102.

The read/write apparatus 5 transmits information, which indicates that the cartridge 8 has loaded, to the server 102. The server 102 receives information output by the controller 9 and the read/write apparatus 5. Then, the server 102 transmits a command, which instructs that data to be written on the recording medium contained by the cartridge 8, and writing data (for example, data received from the client 101) to the read/write apparatus 5. The read/write apparatus 5 writes data on the recording medium in accordance with the control of the server 102.

When data writing is completed, the read/write apparatus 5 notifies the completion of data writing to the server 102. In response to this notification, the server 102 instructs the controller 9 to unload the cartridge 8 from the read/write apparatus 5 and to store the unloaded cartridge 8 to the magazine 4.

In response to this instruction, the controller 9 rotates the motor 11b to turn the turn table 11 such that the clamp 10 is directed to the read/write apparatus 5. After that, the controller 9 causes (control) the clamp driving section 14 to open the pair of clamp arms 13a and 13b and to move the clamp 10 towards the read/write apparatus 5. Sequentially, the controller 9 controls the clamp drive section 14 to close the clamp arms 13a and 13b and to hold the cartridge 8. Then, the controller 9 causes the clamp 10 to move backward in order to unload the cartridge 8 from the read/write apparatus 5.

After that, the controller 9 drives the motor 20 to be rotated to move up or down the guide lifter 21 and lifter base 22. Then, the controller 9 positions the clamp 10 to such a height that the cartridge 8 can be loaded on the magazine 4. After that, the controller 9 controls the clamp drive section 14 to rotates the motor 11b and to turn the turn table 11 such that the clamp 10 faces to the magazine 4. Then, the controller 9 controls the clamp drive section 14 to move the clamp 10 forward and to store the cartridge 8 to the magazine 4. After that, the controller 9 controls the clamp drive section 14 to open the clamp arms 13a and 13b and to move the clamp 10 backward.

By carrying out the aforementioned control operations, the controller 9 causes the accessor mechanism 6 to transfer the cartridge 8 from the magazine 4 to the read/write apparatus 5 or from the read/write apparatus 5 to the magazine 4.

An explanation is next given of a case that the accessing cartridge 8 and the read/write apparatus 5 that is used for accessing the cartridge 8 are positioned at the different library apparatus 2.

Figure 11:
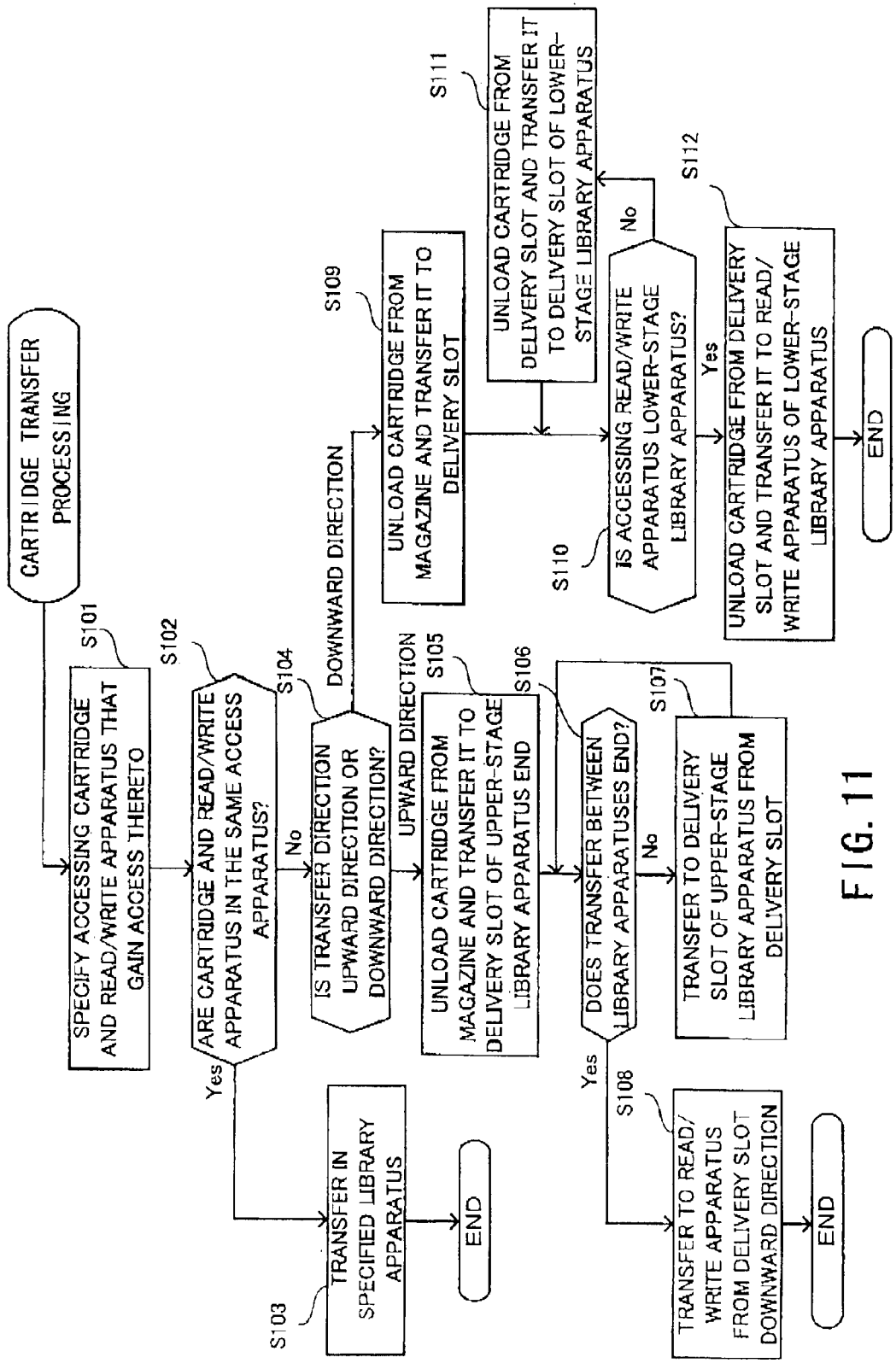
FIG. 11 is flowchart explaining the operation or the cartridge transfer operation of the library apparatus.

In this case, in step S102 of FIG. 11, it is determined that the accessing cartridge 8 and the read/write apparatus 5 that is used for accessing the cartridge 8 are not positioned at the same library apparatus 2, and the processing flow proceeds to step S104.

In step S104, it is determined whether the transferring direction of the cartridge 8 is an upward direction or a downward direction. If the library apparatus 2 where the accessing cartridge 8 is positioned is placed under the library apparatus 2 where the read/write apparatus 5 is positioned, the transferring direction is an upward direction. In the reverse case, the transferring direction is a downward direction.

When it is determined that the transferring direction of the cartridge 8 is an upward direction, the processing flow proceeds to step S105.

In order to make the explanation understandable, an explanation is hereinafter given of a case that the cartridge 8 stored in the magazine 4 of the library apparatus 2a placed at the lowest stage shown in FIG. 1 is transferred to the read/write apparatus 5 of the library apparatus 2d placed at the highest stage.

In this case, the server 102 first instructs the controller 9 of the library apparatus 2a to transfer the cartridge 8 stored in the magazine 4 to the delivery slot 7 of the library apparatus 2b (step S105).

In response to the instruction from the server 102, the controller 9 of the library apparatus 2a rotates the motor 20 in accordance with an output from the position sensor group 111 to move up or down the guide lifter 21 and lifter base 22, and positions the clamp 10 to such a height that the specified cartridge 8 can be unloaded.

Next, the controller 9 turns the turn table 11 such that the clamp 10 is directed to the magazine 4 on which the specified cartridge 8 is stored. The controller 9 controls the clamp drive section 14 to open the clamp arms 13a and 13b and to move the clamp 10 forward.

After that, the controller 9 controls the clamp drive section 14 to hold the cartridge 8 with the clamp arms 13a and 13b, to move the clamp 10 downward and to unload the cartridge 8 from the magazine 4.

Next, the controller 9 rotates the motor 20 to move up the guide lifter 21 and lifter base 22, and positions the clamp 10 to the delivery slot 7 of the library apparatus 2b placed at the upper stage. Sequentially, the controller 9 turns the turn table 11 such that the clamp 10 faces to the delivery slot 7.

After that, the controller 9 controls the clamp drive section 14 to position the clamp 10 to the delivery slot 7 and to insert the cartridge 8 into the delivery slot 7. Sequentially, the controller 9 controls the clamp drive section 14 to open the clamp arms 13a and 13b, to release the cartridge 8, and to move the clamp 10 backward. After that, the controller 9 rotates the motor 20 to move down the guide lifter 21 and lifter base 22 and to return them to their home positions in the library apparatus 2a. Then, the controller 9 notifies the server 102 of the completion of transferring the cartridge.

In response to this notification, the server 102 determines whether or not the transfer of cartridge 8 between the library apparatuses 2 is completed (step S106). In this example, since it is necessary to further transfer the cartridge 8 from the library apparatus 2b to the library apparatus 2d, it is determined that the transfer between the library apparatuses 2 is not completed (step S106: NO).

Figures 12A, 12B, 12C:
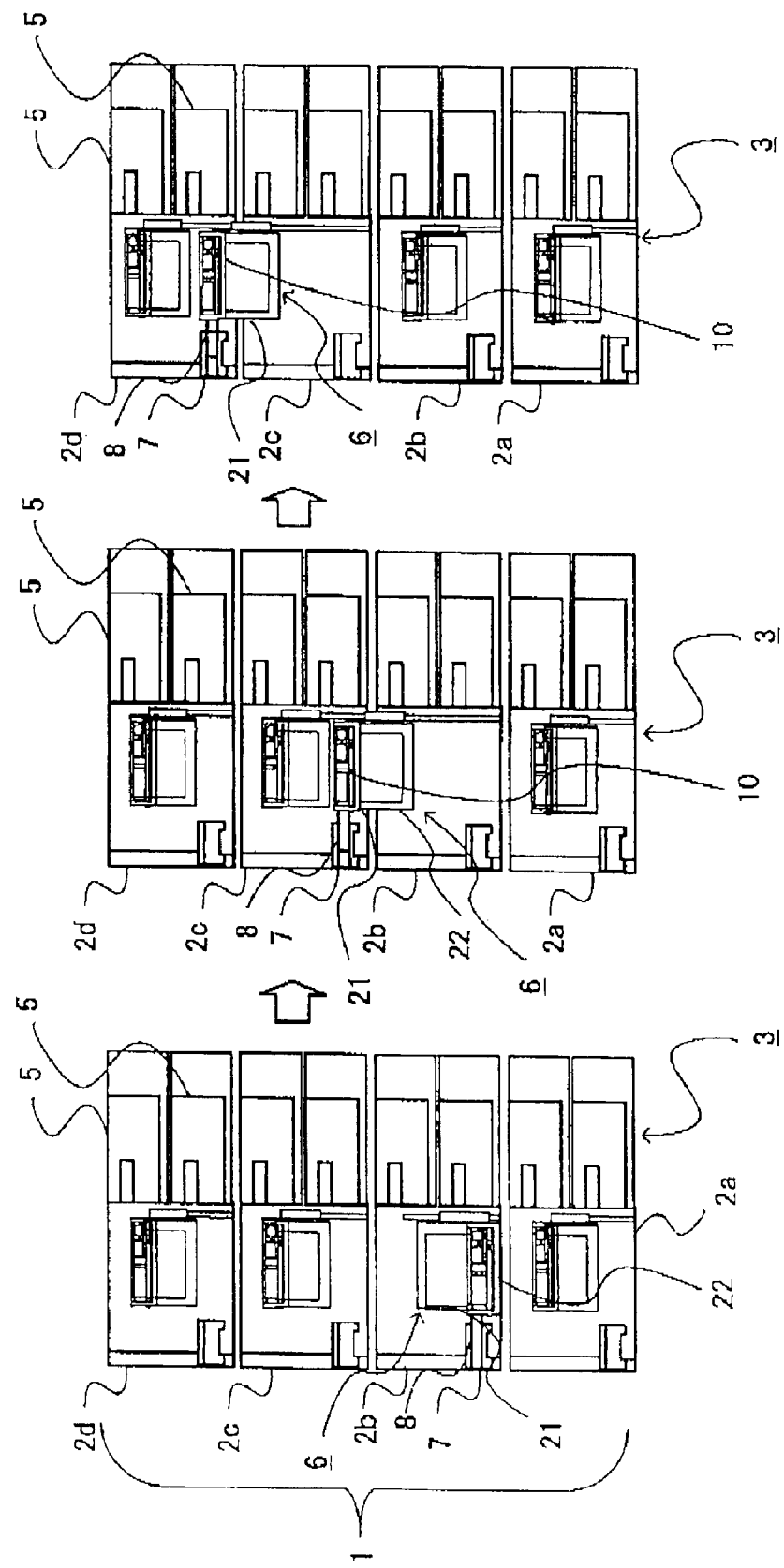
FIGS. 12A to 12C are side views each explaining the operations of the library apparatus and the library system.

As a result, the server 102 causes (controls) the library apparatus 2b to transfer the cartridge 8 to the delivery slot 7 of the library apparatus 2c placed at the upper stage (step S107). More specifically, the server 102 instructs the controller 9 of the library apparatus 2b to transfer the cartridge 8 to the delivery slot 7 of the library apparatus 2c placed at the upper stage. In response to this instruction, the controller 9 of the library apparatus 2b rotates the motor 20 to position the clamp 10 to the delivery slot 7 as shown in FIG. 12A. The controller 9 drives the motor 11b to turn the turn table 11 so that the clamp 10 is directed to the delivery slot 7. The controller 9 controls the clamp drive section 14 to unload the cartridge 8 from the delivery slot 7 by the clap 10.

Next, the controller 9 rotates the motor 20 to move up the guide lifter 21 and lifter base 22 and to align the clamp 10 to the height level of the delivery slot 7 of the library apparatus 2c placed at the upper stage as shown in FIG. 12B. After that, the controller 9 controls the clamp drive section 14 to insert the cartridge 8 into the delivery slot 7. Sequentially, the controller 9 moves down the guide lifter 21 and lifter base 22 to return them to their home positions in the library apparatus 2b. The controller 9 notifies the server 102 that a series of transfer operations are completed.

The server 102 determines whether or not the transfer of cartridge 8 between the library apparatuses 2 is completed (step S106). In this example, since it is necessary to further transfer the cartridge 8 from the library apparatus 2c to the library apparatus 2d, it is determined that the transfer between the library apparatuses 2 is not completed (step S106: NO). Then, the server 102 executes processing of step S107 and causes (controls) the library apparatus 2c to transfer the cartridge 8 to the delivery slot 7 of the library apparatus 2d placed at the highest stage as shown in FIG. 12C.

After that, in step S106, the server 102 determines that the transfer of cartridge 8 between the library apparatuses 2 is completed (step S106: YES). The processing flow proceeds to step S108.

In step S108, the server 102 causes (controls) the library apparatus 2d to transfer the cartridge 8 inserted into the delivery slot 7, to the read/write apparatus 5. Afterward, the server 102 gains access to the recording medium stored in the cartridge 8 through the read/write apparatus 5 of the library apparatus 2d.

On the other hand, in step S104, when it is determined that the transferring direction of the cartridge 8 is a downward direction (step S104: "downward"), the processing flow proceeds to step S109. In order to make the explanation understandable, an explanation is hereinafter given of a case that the cartridge 8 stored in the magazine 4 of the library apparatus 2d placed at the highest stage is unloaded and this unloaded cartridge 8 is loaded to the read/write apparatus 5 of the library apparatus 2a placed at the highest stage.

In this case, the server 102 first unloads the cartridge 8 stored in the magazine 4 of the library apparatus 2d and inserts it into the delivery slot 7 (step S109). When the transfer operation ends, the controller 9 of the library apparatus 2d notifies the server 102 of the end of the transfer operation.

In response to this notification, the server 102 determines whether or not the specified read/write apparatus 5 is a read/write apparatus 5 of the library apparatus 2 placed at the lower stage of the library apparatus 2 that holds the cartridge 8 currently (step S110).

In this example, since the cartridge 8 is placed at the library apparatus 2d and the read/write apparatus 5 of the library apparatus 2a is used, it is assumed that determination is NO.

As a result, the server 102 instructs the library apparatus 2c to transfer the cartridge 8. In response to this instruction, the controller 9 of the library apparatus 2c transfers the cartridge 8 inserted in the delivery slot 7 of the upper-stage library apparatus 2d to the delivery slot 7 of the library apparatus 2c (step S111).

The server 102 determines whether or not the specified read/write apparatus 5 is a read/write apparatus 5 of the lower-stage library apparatus 2 (step S110). In this example, since the cartridge 8 is placed at the library apparatus 2c and the read/write apparatus 5 of the library apparatus 2a is used, the determination would be NO. The server 102 causes (control) the library apparatus 2c to perform the operation of step S111 and to transfer the cartridge 8 of the delivery slot of the library apparatus 2c to the delivery slot 7 of the library apparatus 2b.

Next, the server 102 determines whether or not the specified read/write apparatus 5 is a read/write apparatus 5 of the lower-stage library apparatus 2 (step S110). In this example, since the read/write apparatus 5 is placed at the lower-stage library apparatus 2a, determination is YES and the processing flow proceeds to step S112.

The server 102 instructs the library apparatus 2a to transfer the cartridge 8. In response to this instruction, the controller 9 of the library apparatus 2a transfers the cartridge 8 inserted in the delivery slot 7 of the upper-stage library apparatus 2b to the read/write apparatus 5 of the library apparatus 2a. Afterward, the server 102 gains access to the recording medium inserted in the cartridge 8 through the read/write apparatus 5 of the library apparatus 2d.

When access (writing data, reading data) to the recoding medium ends, the server 102 instructs the controller of the library apparatus 2a to unload the cartridge 8 from the read/write apparatus 5 and stores the unloaded cartridge 8 to a suitable magazine by the procedure substantially opposite to the aforementioned procedure.

By use of the aforementioned structure, an accessor mechanism 6 of a certain library apparatus 2 can deliver and receive a recording medium of an accessor mechanism 6 of a library apparatus 2 provided to be adjacent thereto. Accordingly, the plurality of accessor mechanisms 6 delivers and receives the recoding medium to be transferred between the plurality of library apparatuses 2. This makes it possible to share the transfer work efficiently by the plurality of accessor mechanisms 6. In other words, it is unnecessary for each accessor mechanism 6 to take charge of the transfer of recording media to all magazines 4 and read/write apparatuses 5 of the plurality of library apparatuses 2. This makes it possible to reduce time necessary to transfer the recoding media. Accordingly, the recording media can be efficiently transferred.

Figure 13:
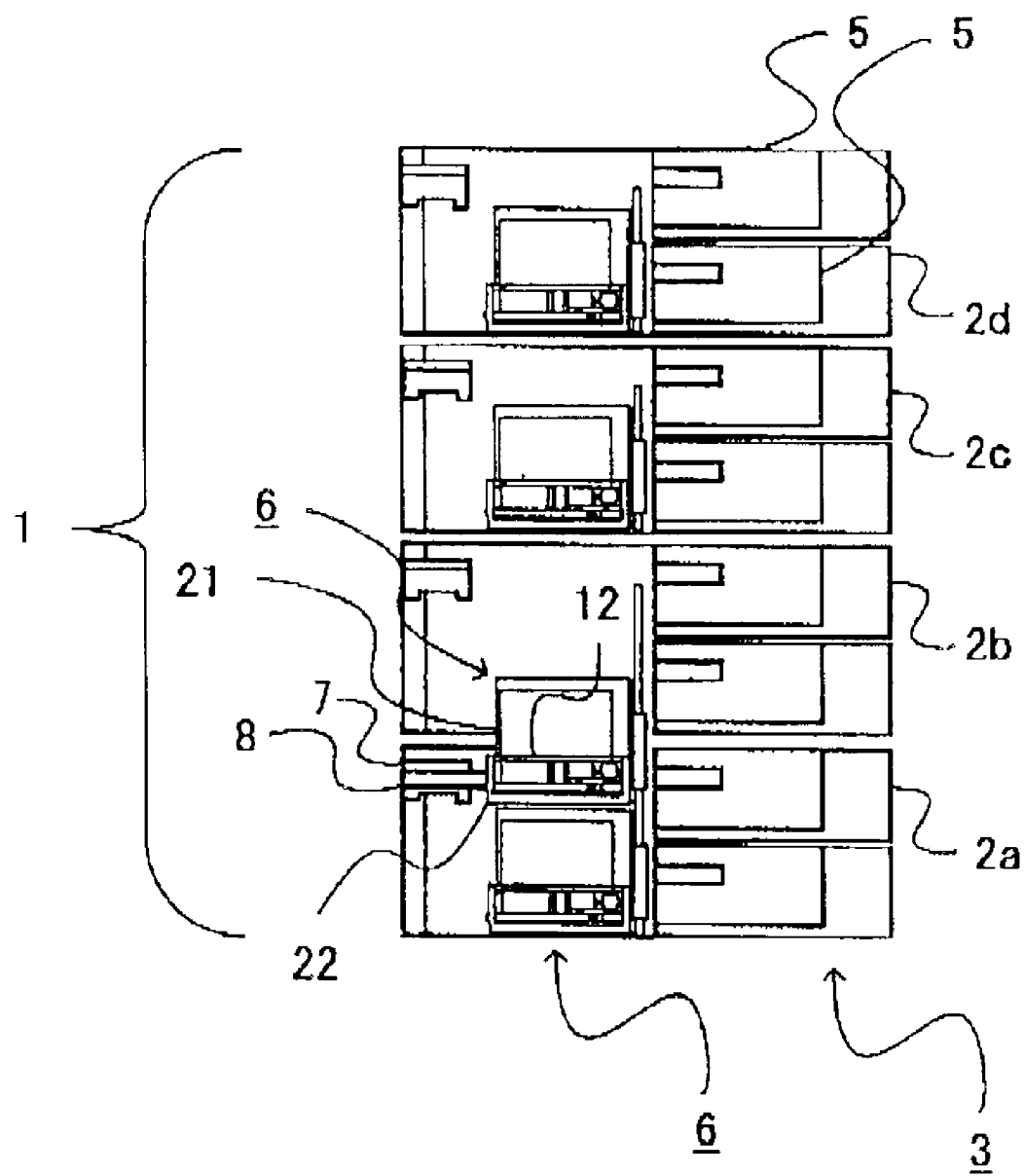
FIG. 13 is a side view explaining the modifications of the library apparatus of the present invention and the library system thereof.

The above embodiment has explained the structure in which the accessor mechanism 6 of each library apparatus 2 inserts the cartridge 8 into the delivery slot 7 of the upper-stage library apparatus 2. However, the present invention is not limited to this, and the accessor mechanism 6 of each library apparatus 2 may enter the lower-stage library apparatus 2 to deliver the cartridge 8 as shown in FIG. 13. In this case, for example, the delivery slot 7 is placed at such a position that the accessor mechanism 6 of the upper-stage library apparatus 2 can unload the cartridge 8 as illustrated in the figure.

Moreover, regarding the position at which the delivery slot 7 is placed, any position may be possible if the cartridge 8 can be delivered and received between the plurality of library apparatuses 2.

Still moreover, the above embodiment has explained the example of the magnetic tape in which the recording medium is included in the cartridge. However, the present invention is not limited to this. Any recording medium which can write and read data such as an optical disk, a magneto-optical disk, etc., may be used with this present invention. There is no problem if such a recording medium is not contained in the cartridge 8. The structure and shape of the loading/unloading openings 4a for the magazine 4 and those of the clamp 10 can be appropriately changed in accordance with the shape of the recording medium to he used.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-360151 filed on Nov. 26, 2001 and including specification, claims, drawings and summary. The disclosure of the above Japanese Patent Application is incorporated herein by reference in its entirety.

What is claimed is:

1. A library apparatus comprising:
   a controller;
   at least one cabinet for storing a plurality of recording media;
   at least one read/write apparatus that writes or reads data on each recording medium;
   a slot separate from a cabinet and a read/write apparatus to which the recording medium is insertable;
   a transfer mechanism that has a function of transferring the recording medium according to control of said controller;
   a case that contains a cabinet, a read/write apparatus, said transfer mechanism, and said slot;
   wherein said controller causes said transfer mechanism to move a recording medium to and from said slot, said slot being accessible to a transfer mechanism of another library apparatus containing at least one cabinet.

2. The library apparatus according to claim 1, wherein said case has such a configuration that one or more additional library apparatuses can be placed on said library apparatus, the other library apparatuses having the same structure as said library apparatus, wherein a slot is included in each other library apparatus that is placed upon said library apparatus.

3. The library apparatus according to claim 2, wherein a cabinet, a read/write apparatus, and said slot have loading ports for a recording medium, respectively, the respective loading ports are arranged around said transfer mechanism to be directed to said transfer mechanism, and said transfer mechanism includes a lifter mechanism that ascends/descends in a vertical direction to position the recording medium for transfer, and a picker mechanism that rotates and slides in a horizontal direction to deliver the recording medium between delivering and receiving apparatuses.

4. The library apparatus according to claim 3, wherein the picker mechanism includes:
   a turn table, which has a motor that rotates according to control of said controller, and which turns by use of a rotational force of the motor; and
   a clamp drive section, which has a pair of clamps and which slides on the turn table linearly, and which opens and closes the pair of clamps to hold the recording medium to unload the recording medium from a cabinet, a read/write apparatus, and said slot or load thereon.

5. The library apparatus according to claim 3, wherein the lifter mechanism includes:
   a base section on which the picker mechanism is mounted;
   a guide section that contains the base section to be movable up and down;
   a first transmission mechanism, which has a motor that rotates according to control of said controller and which moves up and down the guide section by use of a rotational force of the motor; and
   a second transmission mechanism, which is connected with the first transmission mechanism and which moves up and down the base section in the guide section by use of the ascent and descent movement of the guide section.

6. The library apparatus according to claim 5, wherein the lifter mechanism is structured such that the guide section can ascend/descend and the base section can ascend/descend in the guide section.

7. A library system wherein a plurality of library apparatuses described in claim 1 are placed on top of each other such that a recording medium can be transferred from one library apparatus to the adjacent library apparatuses, and access to a recording medium placed in an arbitrary library apparatus can be gained by a read/write apparatus of an arbitrary library apparatus.

8. A library system comprising:
   at least one controller;
   a first library apparatus including at least one first cabinet that stores a plurality of recording media, at least one first read/write apparatus that writes or reads data on each recording medium, a slot separate from a first cabinet and a first read/write apparatus to which a recoding medium is insertable, and a first transfer mechanism having a function of transferring a recording medium according to the control of said controller; and a second library apparatus including at least one second cabinet that stores a plurality of recording media, at least one second read/write apparatus that writes or reads data on each recording medium, and a second transfer mechanism having a function of transferring a recording medium according to the control of said controller, wherein said controller can cause said first transfer mechanism to move a recording medium from a first cabinet to a first read/write apparatus or said slot, said controller can cause said first transfer mechanism to move a recording medium from a first read/write apparatus to a first cabinet, and said controller can cause said first transfer mechanism to move a recording medium from said slot to a first cabinet or a first read/write apparatus, said controller can cause said second transfer mechanism to move a recording medium from a second cabinet to a second read/write apparatus or said slot, said controller can cause said second transfer mechanism to move a recording medium from a second read/write apparatus to a second cabinet or said slot, and said controller can cause said second transfer mechanism to move a recording medium from said slot to a second read/write apparatus.

9. The library system according to claim 8, wherein said controller can cause said first transfer mechanism to unload the recording medium from a first read/write apparatus and to insert said unloaded recording medium to said slot, and said controller can cause said second transfer mechanism to unload the recording medium from said slot and to store the unloaded recoding medium to a second cabinet.

10. A library system comprising:
at least one controller;
a first library apparatus including at least one first cabinet that stores a plurality of recording media, a least one first read/write apparatus that writes or reads data on each recording medium, a slot to which a recording medium is insertable, and a first transfer mechanism having a function of transferring the recording media according to control of said controller; and
a second library apparatus including at least one second cabinet that stores a plurality of recording media, at least one second read/write apparatus that writes or reads data on each recording medium, and a second transfer mechanism having a function of transferring the recording media according to control of said controller,
wherein said controller causes said first transfer mechanism to load and unload a recording medium to and from said at least one first cabinet, said at least one first read/write apparatus and said slot, and said controller causes said second transfer mechanism to load and unload a recording medium to and from said at least one second cabinet, said at least one second read/write apparatus and said slot,
wherein said first library apparatus includes a first case that contains said at least one first cabinet, said at least one first read/write apparatus, said slot and said first transfer mechanism, said second library apparatus includes a second case that contains said at least one second cabinet, said at least one second read/write apparatus, and each of said first and second cases have a configuration such that said first and second library apparatus can be placed on top of each other.

11. The library system according to claim 10, wherein said transfer mechanisms include a lifter mechanism that ascends/descends in a vertical direction to position the recording medium for transfer, and a picker mechanism that rotates and slides in a horizontal direction to deliver the recording medium between delivering and receiving apparatuses.

12. The library system according to claim 11, wherein the picker mechanisms include:
a turn table, which has a motor that rotates according to control of said controller, and which turns by use of a rotational force of the motor; and
a clamp drive section, which has a pair of clamps and which slides on the turn table linearly, and which opens and closes the pair of clamps to hold the recording medium to unload the recording medium from a cabinet, a read/write apparatus, and said slot or load thereon.

13. The library system according to claim 11, wherein the lifter mechanisms include:
a base section on which the picker mechanism is mounted;
a guide section that contains the base section to be movable up and down;
a first transmission mechanism, which has a motor that rotates according to control of said controller and which moves up and down the guide section by use of a rotational force of the motor; and
a second transmission mechanism, which is connected with the first transmission mechanism and which moves up and down the base section in the guide section by use of the ascent and descent movement of the guide section.

14. The library system according to claim 13, wherein the lifter mechanisms are structured such that the guide section can ascend/descend and the base section can ascend/descend in the guide section.

15. A library apparatus comprising:
at least one storing section that can store a plurality of recording media;
at least one read/write apparatus that can access to each recording medium;
a holding section, separate from a storing section and a read/write apparatus, that holds the recording medium; and
transferring means that transfers the recording medium among said storing section, said read/write apparatus, and said holding section, said holding section being accessible to a transfer mechanism of another library apparatus containing at least one cabinet.

16. A library system wherein a plurality of library apparatuses described in claim 15 are placed on top of each other such that a recording medium can be transferred from one library apparatus to the adjacent library apparatuses, and access to the recording medium placed in a storing section of an arbitrary library apparatus can be gained by a read/write apparatus of an arbitrary library apparatus.

17. A library apparatus comprising:
a plurality of storing means that store a plurality of recording media;

access means that accesses to each recording medium;

a holding section that holds the recording medium; and transferring means that transfers the recording medium among said storing section, said access means, and said holding section, said holding section being accessible to a transfer mechanism of another library apparatus containing at least one cabinet.

18. A library system wherein a plurality of library apparatuses described in claim 17 are placed on top of each other such that a recording medium can be transferred from one library apparatus to the adjacent library apparatuses, and access to the recording medium placed in a storing section of an arbitrary library apparatus can be gained by a read/write apparatus of an arbitrary library apparatus.

19. A library system for recording media comprising:

a first library apparatus including a first storage area for receiving and storing recording media, at least one first read/write apparatus capable of receiving a recording medium, a first transfer mechanism adjacent to said first read/write apparatus and said first storage area and capable of transferring a recording medium among said first storage area, and said first read/write apparatus, and a first case which holds said first storage area, said first read/write apparatus, and said first transfer mechanism;

a second library apparatus including a second storage area for receiving and storing recording media, at least one second read/write apparatus capable of receiving a recording medium, a second transfer mechanism adjacent to said second read/write apparatus and said second storage area and capable of transferring a recording medium among said second storage area, and said second read/write apparatus, and a second case which holds said second storage area, said second read/write apparatus and said second transfer mechanism;

at least one controller which controls the function of said transfer mechanisms;

a transfer section accessible by both said first transfer mechanism and said second transfer mechanism, through which a recording medium of said first library apparatus may be transferred to said second library apparatus and a recording medium of said second library apparatus may be transferred to said first library apparatus.

20. The library system of claim 19 wherein said transfer section includes a slot.

21. The library system of claim 19 wherein said transfer section is part of at least said first library apparatus.

22. The library system of claim 19 wherein one of said library apparatuses is placed on top of the other of said library apparatuses.

23. The library system according to claim 19, wherein said transfer mechanisms include a lifter mechanism that ascends/descends in a vertical direction to position a recording medium for transfer, and a picker mechanism that rotates and slides in a horizontal direction to deliver the recording medium between delivering and receiving apparatuses.

24. The library system according to claim 23, wherein the picker mechanisms include:

a turn table, which has a motor that rotates according to control of said controller, and which turns by use of a rotational force of the motor; and a clamp drive section, which has a pair of clamps and which slides on the turn table linearly, and which opens and closes the pair of clamps to hold the recording medium to unload the recording medium from a cabinet, a read/write apparatus, and said transfer section or load thereon.

25. The library system according to claim 23, wherein the lifter mechanisms include:

a base section on which the picker mechanism is mounted;

a guide section that contains the base section to be movable up and down;

a first transmission mechanism, which has a motor that rotates according to control of said controller and which moves up and down the guide section by use of a rotational force of the motor; and a second transmission mechanism, which is connected with the first transmission mechanism and which moves up and down the base section in the guide section by use of the ascent and descent movement of the guide section.

26. The library system according to claim 25, wherein the lifter mechanisms are structured such that the guide section can ascend/descend and the base section can ascend/descend in the guide section.

* * * * *